United States Patent [19]

McGaha

[11] Patent Number: 5,125,363
[45] Date of Patent: Jun. 30, 1992

[54] VERTICALLY POSITIONABLE, TRANSPORTABLE FOOD PRODUCT SERVER

[76] Inventor: Jim R. McGaha, 11548 Mahaffey Rd., Tomball, Tex. 77375

[21] Appl. No.: 730,048

[22] Filed: Jul. 15, 1991

Related U.S. Application Data

[63] Continuation-in-part of Ser. No. 560,086, Jul. 30, 1990, abandoned.

[51] Int. Cl.$^5$ ................................................ A01K 5/00
[52] U.S. Cl. ...................................... 119/51.5; 119/61
[58] Field of Search ................. 119/61, 51.5, 51.01; 220/356

[56] References Cited

U.S. PATENT DOCUMENTS

| | | | |
|---|---|---|---|
| 2,191,811 | 2/1940 | Tranpier | 119/51.5 |
| 2,543,465 | 2/1951 | Morey | 119/51.5 |
| 3,441,003 | 4/1969 | DuMond et al. | 119/61 |
| 3,810,446 | 5/1974 | Kightlinger | 119/61 |
| 4,128,080 | 12/1978 | Haney | 119/51.5 |
| 4,896,627 | 1/1990 | Riddel | 119/51.5 |
| 4,953,506 | 9/1990 | Sanders | 119/61 |
| 5,031,575 | 7/1991 | Phillips | 119/61 |

FOREIGN PATENT DOCUMENTS

| | | | |
|---|---|---|---|
| 3033974 | 4/1982 | Fed. Rep. of Germany | 119/61 |
| 738069 | 12/1932 | France | 119/61 |
| 73623 | 11/1953 | Netherlands | 220/356 |

Primary Examiner—John G. Weiss
Attorney, Agent, or Firm—James L. Jackson

[57] ABSTRACT

A food and liquid serving assembly is provided for serving food products to humans or pets. The apparatus includes a lower dish for containing solid or liquid food products and is provided with bottom and side walls and an upper dish also having bottom and side walls. A pedestal projects downwardly from the bottom wall of the upper dish and supports the upper dish. The pedestal is of sufficient length that the upper dish is positioned above the level of the lower dish. The pedestal is receivable in supported relation within a tubular support element projecting upwardly from the bottom wall of the lower dish. The tubular support element is positioned in off-center relation relative to the bottom wall of the lower dish such that an outer peripheral portion of the upper dish is located radially outwardly of the lower dish. The pedestal and tubular support element may be interlocked by a locking element to connect the upper and lower dishes in releasable assembly. Locking covers are provided for both the upper and lower dishes for use when the dishes are not assembled.

12 Claims, 2 Drawing Sheets

VERTICALLY POSITIONABLE, TRANSPORTABLE FOOD PRODUCT SERVER

This is a continuation-in-part of the subject matter of U.S. patent application Ser. No. 07/560,086 of Jim R. McGaha, filed on July 30, 1990 now abandoned and entitled Insect Resistant Pet Feeder and Waterer.

FIELD OF THE INVENTION

This invention relates generally to food dishes for humans and animals which are capable of being superposed to minimize the space requirements therefor and which are capable of being transported with solid or liquid food products therein. One aspect of this invention is directed to feeding and watering dishes or containers for pets such as dogs and cats and more specifically relates to combination pet feeding and watering devices that utilize water which is provided for the pet to drink and which also serves as a medium for isolation of the pet food from access by ants and other crawling insects that are attracted to the pet food.

BACKGROUND OF THE INVENTION

Food and liquid containing dishes are widely used for dining activities and are also used for recreational dining such as for picnics, camping activities, and the like. To minimize the space requirements for such dishes, bowls or containers, it is desirable to vertically stack them in such manner that they may be utilized in their vertically oriented position especially for picnics and camping activities. It is also desirable to provide food and liquid containers that also function as serving dishes and which are capable of being provided with tight, removable covers to enable them to be transported with solid or liquid food products located therein.

Pets are typically provided with food and water through the use of food bowls or dishes and water containers. Especially in the case of dry pet food, the pet food is typically placed within a food bowl or receptacle and is allowed to remain available to the pet for extended periods of time. Especially in the case of the out-of-door environment, the pet food tends to attract numerous insects including ants, roaches, etc. When infested with these crawling insects, obviously, the pet food must be discarded. It is desirable, therefore, to provide a facility for making pet food available to animals for extended periods of time while at the same time protecting the pet food from access by various types of crawling insects. In many cases, it is desirable to transport food and water for dogs and other animals such as when the animals are being transported along with the family. For purposes of transportation, it is desirable to provide such containers with tight covers so that the food and liquid products will not spill during transportation. Periodically, the containers may be uncovered and positioned in vertically stacked orientation for temporary use by the animal for feeding and watering such as during rest stops or stops for food and lodging.

PRIOR ART

For the purpose of serving food and liquid products to humans, such as during dinners, parties, picnics, etc. various types of vertically stacked or oriented food serving dishes have been employed in the past. For the purpose of feeding and watering animals, various types of pet food dishes have been developed for the purpose of preventing or minimizing access to pet food by insects that might be present in the environment where the pet is fed. In some cases pet food containers have been provided with extended legs which tend to discourage access by certain insects. It is well known, however, that ants can traverse most materials and will readily invade pet food that is handled in this manner. As taught by Carpenter U.S. Pat. No. 4,357.905, a pet food and watering device has been developed with a pet food receptacle being surrounded by a moat, with water entering the moat from the water containing receptacle and thus forming a barrier that prevents access to the pet food by ants and other crawling insects. U.S. Pat. Nos. 4,128,080; 3,734,063; 4,896,677; 4,357,905; 2,584,301; 2,677,350; 1,351,285; 2,583,218; 2,191,811 and Des 258,018 illustrate similar pet feeding and watering devices. A pet food and watering container of this nature is relatively expensive to manufacture and market. Consequently, pet feeder and watering devices of this nature are not readily available. Further, the water containing moat is typically of relatively narrow nature and therefore provides little resistance to access by fairly large insects such as roaches. It is desirable, therefore, to provide pet feeding and watering apparatus that readily prevents access to pet food by virtually all insects regardless of size.

For the serving of food and liquid products to humans, especially for parties, picnics, camping activities and the like, it is desirable to provide food transporting and serving dishes that may be appropriately covered and sealed for storage and to prevent spillage and may be uncovered and vertically oriented for use so as to require minimal space for serving a wide variety of food and liquid products. For example, a lower large serving dish may compartmented such as for the serving of a variety of party chips while an upper compartmented serving dish may be employed for serving a variety of party dips.

SUMMARY OF THE INVENTION

It is a primary feature of this invention to provide a novel, transportable food serving system for serving a wide variety of food products to humans and which may be vertically oriented for conservation of space and for efficiency of use.

It is a principle feature of the present invention, therefore, to provide novel apparatus for serving food products that includes a liquid insect barrier which is of substantial dimension and which restricts access to food by virtually all crawling insects.

It is another feature of this invention to provide novel apparatus for serving food products wherein a food container is provided which is substantially elevated above the water level in a lower serving container to as to minimize the probability that crawling insects might be attracted by the food.

It is an even further feature of this invention to provide novel apparatus for serving food products where a food containing receptacle is placed on a relatively narrow pedestal which extends upwardly through water contained within a vessel having a water surface area of substantial dimension to preclude access to the food products by virtually all crawling insects.

It is another feature of this invention to provide apparatus for serving food products, which, in the case of pet feeding and watering apparatus, elevates the pet food well above water level so as to minimize attraction of insects to the pet food.

It is another important feature of this invention to provide novel apparatus for serving food products which is of insect resistant nature and which includes a water container and a food container that are assembled in unitary fashion and are capable of being disassembled for efficient handling and cleaning.

It is also a feature of this invention to provide a novel apparatus for serving food products which in the case of pets permits pet food released by the pet immediately beyond the perimeter of the feeding dish to fall into the water of the water containing vessel to thereby insure that ants and other crawling insects are not attracted thereto.

Other and further objects and features of the present invention will become obvious to one upon an understanding of the preferred embodiments to be described hereinbelow.

Briefly, apparatus constructed in accordance with the present invention includes a relatively large dimensioned food or water containing dish which may be of circular form or may take any other suitable configuration within the spirit and scope hereof. The large bottom dish may be compartmented so as to provide for efficient serving of breads or chips when used for human food serving activities. In the case of pet food services, the large bottom dish may contain drinking water for pets which also functions as a liquid barrier to prevent access to pet food by crawling insects. The invention is discussed herein particularly as it relates to feeding and watering devices for pets, but it is not intended that this invention be limited by such discussion.

A pedestal member projects upwardly from the bottom of the bottom dish so that it is surrounded by water that is contained within the dish. The dish will typically contain water forming a large surface area so that there is a significant distance between the side wall of the dish and the pedestal. This will discourage even large insects from attempting to reach the pedestal. At the upper portion of the pedestal is provided an upper dish within which pet food is placed and may be allowed to remain accessible to the pet for extended periods of time. The perimeter of the upper dish is positioned for the most part above and inside the perimeter of the lower dish and with a peripheral section of the upper projecting beyond the outer periphery of the lower dish. This feature insures that any food that is dropped by the pet in the immediate vicinity of the perimeter of the food containing dish will not fall into the water but will fall to the floor where it is usually picked up immediately by the pet. The lower dish and the upper dish are separatable to permit ease and efficiency of handling and cleaning and transporting. For transporting or protecting food products the serving dishes are provided with removable covers that establish an efficient seal with the upper edge of the respective dish and establish a snap fit with the upper edge thereof.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 is a sectional view of a food serving apparatus that is constructed in accordance with the present invention, the sectional view being taken along line 1—1 of FIG. 2.

FIG. 2 is a plan view of the food serving apparatus of FIG. 1.

FIG. 3 is a sectional view representing an alternative embodiment of the present invention and showing food serving apparatus including an upper dish that is separatable from a lower dish to thereby facilitate ease of handling and cleaning and to facilitate transportation of the food serving apparatus.

FIG. 4 is a sectional view of the food serving apparatus representing a further alternative embodiment of this invention wherein the upper dish is located on a pedestal that is mounted in off-center relation to the bottom wall of the lower dish.

FIG. 5 is a plan view of the food serving apparatus of FIG. 4 illustrating upper and lower dishes of generally rectangular configuration.

FIG. 6 is a sectional view of a food serving assembly representing an alternative embodiment of the present invention.

FIG. 7 is a sectional view of the bottom dish portion of the embodiment of FIG. 6 and illustrating a releasable interlocking cover in assembly therewith and by broken lines, showing the interlocking cover partially lifted from the bottom dish.

FIG. 8 is a sectional view of the upper dish portion of the apparatus of FIG. 6 showing an interlocking cover being attached thereto and showing the dish and dish support structure lying on a flat support surface.

FIG. 9 is a plan view of the dish structure of FIGS. 6 and 8, illustrating the compartmentalized structure thereof.

DETAILED DESCRIPTION OF PREFERRED EMBODIMENT

Figure 1:
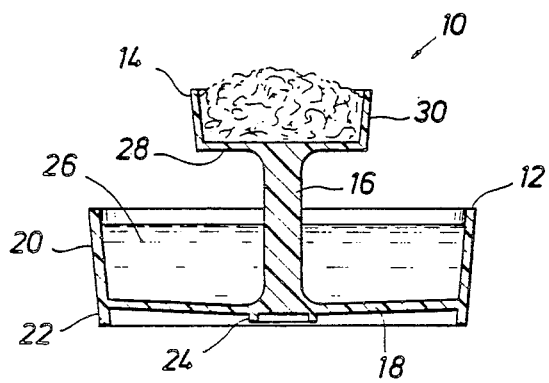

Referring now to the drawings and first to FIG. 1, food and water containing apparatus is illustrated generally at 10 and incorporates as its basic components a lower dish 12, an upper dish or receptacle 14 and a pedestal 16 that interconnects the bottom walls of the upper and lower dishes. It should be born in mind that the lower dish 12 may also be used to contain food products depending on the manner of use intended for the apparatus. In the case of pet food and water servers water in the lower dish 12 forms an effective barrier to access of the pet food by crawling insects. The pedestal projects upwardly through water contained within the lower dish 12 and is thus surrounded by the water. The components of the apparatus may be composed of wood, metal, any suitable polymer material, or any other material suitable for the purposes intended.

The lower dish 12, for use as a pet feeder and waterer, incorporates a bottom wall structure 18 having side wall means 20 formed integrally therewith. Typically, the side wall 20 is of slightly tapered configuration so that the surface area of the water within the lower dish 12 is as large as is practical for ease of access by the pet for the purpose of drinking. Further, although the lower dish 12 may be of any suitable dimension, typically it will be of fairly large dimension, i.e., in the order of from 8 to 12 inches in diameter to insure that a large water surface area is presented about pedestal 16 to discourage all types of crawling insects from attempting to reach the pedestal and gain access to the upper dish 14. The side wall 20 of the lower dish 12 includes a lower projection 22 that extends below the level of the bottom wall 18 to thus insure that the bottom wall is disposed in elevated relation with respect to the floor or other surface on which the feeding and watering apparatus is placed. This feature prevents thermal interchange from the supporting surface through the bottom wall to the water and thereby allows the water to remain at a cool ambient temperature even trough the supporting surface, i.e., concrete floor, may be relatively warm. At its interior, the bottom wall 18 is provided with a downwardly projecting interior perimeter which is provided for the purpose of enhancing the rigidity or structural integrity of the bottom wall. The side wall 20 is typically of substantially greater height in comparison to the height of typical water containing dishes for pets, for example in the order from 2 to 6 inches or more to hereby insure that a substantially large volume of water 26 is contained within the lower dish 12. This feature insures that the volume of water within the dish will greatly exceed that used by the pet and the water that can evaporate, thus assuring that water will remain within the lower dish 12 and about the pedestal 16 for long periods of time to prevent insects from gaining access to the upper dish 14.

The upper dish 14 is shown in FIG. 1 as being integrally formed with or attached to the upper end of the pedestal 16. This feature permits simplicity of manufacture, thus providing a relatively low cost pet feeding and watering mechanism within the scope of the present invention. From the standpoint of simplicity of manufacture, the lower dish 12, the upper dish 14 and the pedestal 16 may be separately manufactured parts which may be assembled by bonding or cementing if such is desired. Alternatively, the entire structure 10 may be integrally formed such as by a molding operation.

Figure 2:
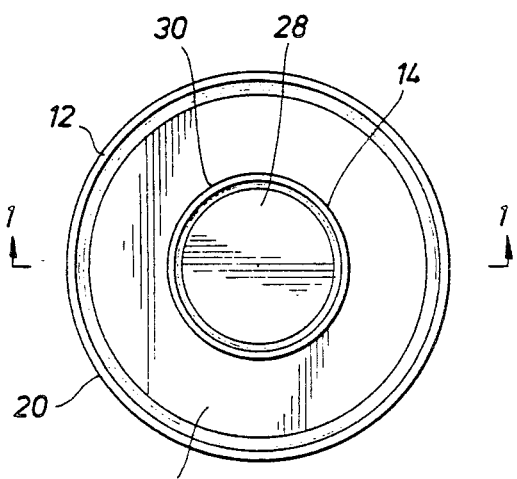

The upper dish 14 will be provided with a bottom wall 28 of any suitable configuration, such as circular as shown in FIG. 2 and a side wall 30 typically of tapered form, essentially of the same taper as wall 20 of lower dish 12. The tapered wall 30 will typically be of less height than the tapered wall 20 so that the dish or receptacle 14 will contain only enough food for the pet to consume within a predetermined period of time. For example, the dish 14 may be in the order of 6 inches or more in diameter and its wall height will typically be in the order of from 2 to 3 inches or more. The outer perimeter of the tapered wall 30 of the upper dish 14 is located above the lower dish 12 and with a portion thereof projecting outwardly beyond the outer perimeter established by its tapered wall 20.

As is evident from FIGS. 1 and 2, the pedestal 16 is located centrally of the circular bottom wall 18 of the lower dish 12 since the dish is quite large, the water surface area will also be quite large and there will be a substantial water surface distance between the pedestal and the side wall. Accordingly, where the apparatus is used as a pet feeder and server any crawling insect attempting to gain access to the upper dish 14 will be required to negotiate a significantly great distance across the water in the lower dish 12 before reaching the pedestal 16. This feature even further insures that no crawling insects will be able to gain access to the pedestal and to the upper dish supported thereby.

Figure 3:
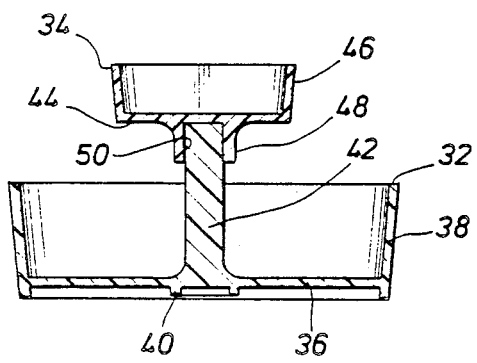

In order to facilitate ease of cleaning of both the upper and lower dishes, it may be considered desirable to separate them for this purpose. Accordingly, an alternative embodiment of the present invention may conveniently take the form illustrated in FIG. 3 where a lower dish is illustrated at 32 and an upper dish is shown at 34. The upper and lower dishes are designed for separation in the manner discussed in further detail hereinbelow.

Figure 5:
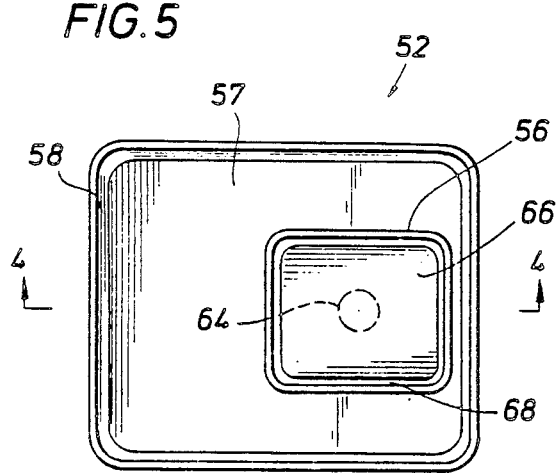

The dish 32 is provided with a bottom wall 36 which may be of circular configuration as shown in FIG. 2, or in the alternative, may take any other suitable form such as rectangular as shown in FIG. 5. The dish 32 includes a side wall 38 which may be of substantially the same dimension and configuration as described above in connection with FIG. 1. The bottom wall 36 is strengthened by one or more downwardly extending projections such as shown at 40.

A pedestal member 42 may be formed integrally with or fixed to releasably attached to the bottom wall 36 and projects upwardly a desired distance above the upper edge of the side wall 38. The upper end of the pedestal 42 may be of generally cylindrical configuration if desired, or in the alternative, it may take any other suitable form. The pedestal may be of relatively large dimension to provide efficient stability between the dish 32 and dish 34. For example, for pet feeding and watering a pedestal of from one inch to two inches in diameter or greater may be employed. The pedestal may also be capable of being cut to any desired length to thus permit the user to adapt the height of the food dish 34 to the height of the pet to be fed and watered thereby. Further, the pedestal may be a separate unit which is releasably connected to both the water dish and the food dish if desired.

The dish 34 defines a bottom wall 44 having a side wall 46 formed integrally therewith and extending upwardly therefrom. The side wall 46, like the side wall 38 of the dish 32, is shown to be of upwardly and outwardly tapered configuration. Such is not intended to be restrictive of the present invention, however, because the dish 34 may be of any suitable configuration.

For the purpose of providing releasable assembly between the dishes 32 and 34, a projection 48 extends downwardly from the bottom wall 44 and defines an internal receptacle 50 within which the upper end of the pedestal 42 is received in close fitting relation. The projection 48 is of sufficient length that the interengaging surfaces of the receptacle 50 and the pedestal 42 provide for efficient stabilization of the dish relative to the dish. Where pets are involved it would be virtually impossible, therefore, for a typical pet to inadvertently separate the upper dish from the water dish. Even further, the two may be disposed in interlocked assembly if desired. It should also be born in mind that a projection of the bottom wall of the lower dish may form a receptacle to receive a pedestal extending downwardly from the bottom wall of the upper dish. Further, the pedestal may be a separate component being received by receptacles formed by the bottom wall of both the upper and lower dish.

Although the pedestal 42 is shown to be positioned centrally of the bottom wall 36, it should be born in mind that it may be offset from the bottom wall if desired.

Figure 4:
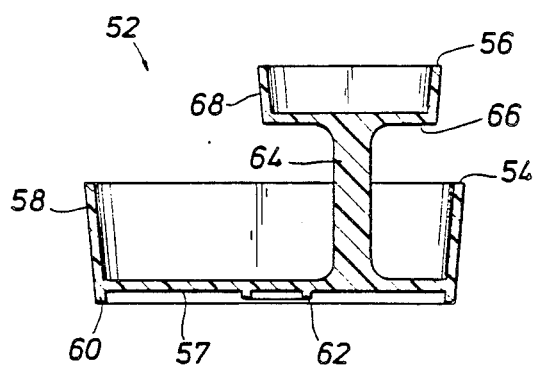

With reference now to FIGS. 4 and 5 a food serving assembly is illustrated generally at 52 which includes a dish 54 and a dish 56 which are disposed in off-center relation with respect to one another. The dish 54 includes a generally rectangular planar bottom wall 56 having tapered side walls 58 formed integrally therewith or attached thereto. The side walls 58 project downwardly below the level of the bottom wall 56 thereby providing a rectangular support 60 which enables the bottom wall to be disposed in spaced relation with a surface upon which it rests. As indicated above, this feature provides for insulation of the water contained within the dish 54 from heat being liberated from the support surface. The bottom wall 56 is further strengthened by one or more downwardly extending projections 62 in the manner described above.

A pedestal member 64 is provided to elevate the dish 56 above the upper edge of the walls 58. Where the apparatus is used for the feeding and watering of pets such elevation of the dish precludes access to the food dish by crawling insects. The pedestal 64 is formed integrally with or suitably attached to the bottom wall 56 and is disposed in off-center relation with respect to the bottom wall. The pedestal 64 is also disposed in spaced relation with the inside surfaces of the wall 58 to thereby insure that water contained within the dish 54 completely surrounds the pedestal at all times. A large dimensioned moat is thus developed about the pedestal that prevents crawling insects from gaining access to the upper dish 56.

The dish 56 comprises a bottom wall structure 66 which is formed integrally with or otherwise suitably attached to the upper end of the pedestal 64. As shown in FIG. 5, the bottom wall 66 is of generally rectangular configuration. Alternatively, the bottom wall 66 may be provided with a depending projection such as is shown at 48 in FIG. 3 to form a receptacle that is received by the pedestal in order to provide for a separatable relation between the dish 54 and the dish 56. The structure of the dish 56 is completed by a side wall 68 which is shown to be of tapered configuration and which is formed integrally with or attached to the bottom wall 66. The off-center relationship of the upper dish to the lower dish, as shown in FIGS. 4 and 5, provides efficient access to the dish by pets of a wide range of sizes and yet provides an efficient barrier to access of the food dish by crawling insects. By providing a water container of significant dimension as shown in all of the embodiments of this invention, it is highly unlikely that all of the water will be consumed prior to the time that the food in the food dish is consumed. Thus, the apparatus will function efficiently for extended periods of time to prevent crawling insects such as ants from gaining access to the food dish and contaminating the food.

Figure 6:
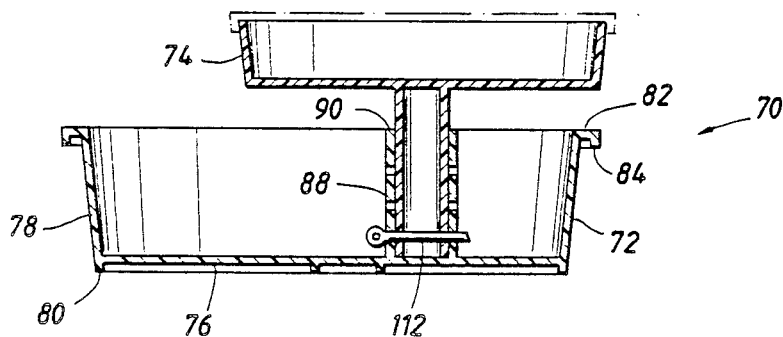

Referring now to FIG. 6, an alternative embodiment of the present invention is shown generally at 70 which includes a large dish 72 which also serves as a dish for containing liquid or solid food products and which also functions to provide structural support for an elevated dish structure 74. The large dish 72 defines a bottom wall 76 to which a tapered side wall 78 is integrally connected. A depending portion 80 of the side wall extends below the bottom wall 76 to thus enable the dish to be supported on any flat surface with the bottom wall disposed in spaced relation therewith.

The upper portion of the side wall 78 defines a circular transverse flange 82 having a peripheral flange 84 projecting downwardly therefrom. The structure of the flanges 82 and 84 permit a cover to be supported in interlocked relation with the upper portion of the dish wall structure to thereby preserve or protect any food products contained therein and provide an effective seal to facilitate efficient transportation of the dish 72 with food products therein. The interlocking dish cover is shown at 86 in FIG. 7.

A generally cylindrical dish support tube 88 is integrally formed with the bottom wall 76 with the upper end 90 thereof being located substantially at the same level as that of the upper surface of the flange 82. This feature enables adequate support of the upper food dish as will be explained hereinbelow and further provides for structural support of the central portion of the cover 86 to minimize the possibility of collapsing of the cover in the event the cover is subjected to the weight of other objects.

Figure 7:
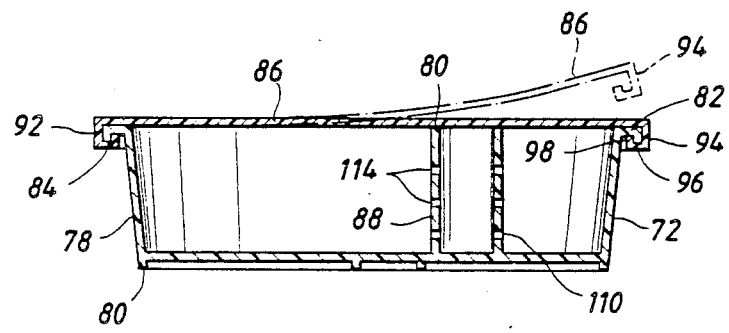

As shown in FIG. 7, the dish cover 86 is of generally planar configuration and is composed of relatively flexible material such as any one of a number of suitable polymers. At its outer periphery the cover 86 defines an interlocking rim 92 having a downwardly projecting section 94, a horizontally projecting section 96 and an upwardly projecting terminal section 98. The interlocking rim 92 is of a configuration establishing efficient interlocking, substantially sealed relation with the peripheral locking rim or flange 82-84 of the dish structure 72. Thus, even when liquid materials such as water are transported in the dish 72, no spillage or leakage will occur even during rough handling.

Figure 8:
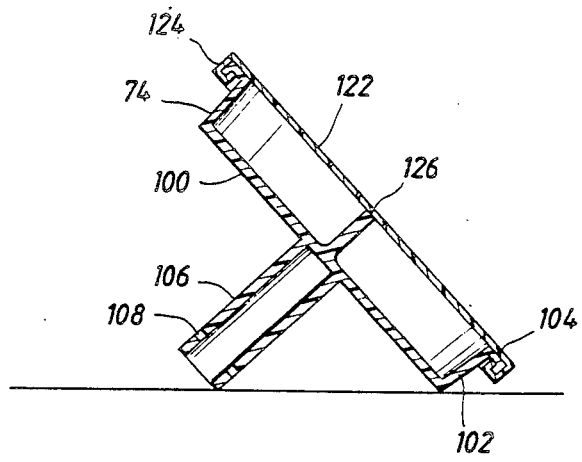
Figure 9:
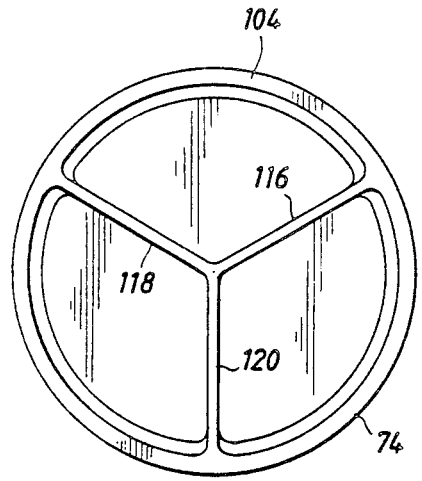

As shown in FIGS. 6, 8 and 9, the upper dish structure 74 defines a lower wall 100 having a side wall 102 formed integrally therewith. At its upper extent, the side wall 102 defines a circular peripheral flange 104 which may be identical as compared with the flange 82 of FIG. 7. From the bottom wall 100 depends an elongate pedestal 106 which may be integrally formed with the bottom wall and which may be of tubular configuration as shown. The pedestal 106 has an external dimension being slightly less than the internal dimension of the tubular dish support structure 88 of FIGS. 6 and 7 such that the dish 74 will be precluded from significant lateral movement as well as being adequately supported relative to the dish 72. Further, the pedestal 106 may be provided with transverse oriented apertures 108 that may be aligned with corresponding apertures 110 of the tubular support element 88 to thus permit a locking pin 112 to be inserted through registering apertures so as to positively lock the dish 74 to the dish 72. Other adjustment apertures 114 may be formed in the tubular support element 88 with which the apertures 108 of the pedestal 106 may be brought into registry. The locking pin 112 may be inserted through respective aligned apertures so as to provide for adjustment of the position of the pedestal 106 relative to the tubular support 88, to thus permit height adjustment of the dish 74 relative to the dish 72.

As shown particularly in FIG. 9, the dish 74 may be compartmentalized by the provision of one or more partitions as shown at 116, 118 and 120 which are especially useful when the dish 74 is intended to contain a plurality of differing food products such as party dips. For example, the partitions 116-120 separate the dish into a plurality of compartments for that purpose. The dish 74 may also be provided with a flexible, interlocking cover 122 which may be of the same construction as shown at 86 in FIG. 7, being provided with an outer peripheral interlocking flange 124 that is of a configuration establishing interlocking relation with the outer peripheral flange 104 of the dish. The upper surfaces 126 of the partitions 116-120 provide structural support for the cover 122 to prevent collapse of the cover in the event it is subjected to the weight of an object resting thereon. The cover 122 also establishes a substantial seal with the outer peripheral flange 104 of the dish to thus protect the contents of the individual compartments from spillage, deterioration or contamination during transport.

Thus, for purposes of human use, especially for parties, picnics, and the like, the dish 72 may be used to contain dry food products such as chips while the dish 74 may be employed to contain liquid or semi-liquid products such as party dips. Alternatively, the dish 72 may be employed to contain a liquid product such as water or various party drinks. These dry or liquid food products may be efficiently transported through the use of the protective covers 86 and 122. Additionally, the dish 72 may be compartmentalized in similar manner as shown in FIG. 9 for the purpose of defining various compartments for containing different kinds of food products such as party chips. As shown in FIG. 6, in its vertically oriented condition, the assembled dish and dish require minimal space and may contain a variety of food products.

When the apparatus is utilized for the feeding and watering of animals such as dogs, cats, etc. it should be noted that the support tube 88 is in offset relation with the center of the bottom wall and is located with respect to the dimension of the dish 74 such that a portion of the outer periphery of the upper dish extends radially outwardly beyond the flange 82 of the lower dish 72. This feature enables relatively small animals to make efficient use of the apparatus by resting their paws on the flange 104 of the dish while eating pet food from the dish. Any food products that may be dropped by the animal will fall onto the floor or other support surface and thus will not contaminate any water or other liquids that may be contained within the dish 72. It is has been determined through tests, however, that virtually no pet food will be dropped by the animal that will not be immediately picked up and consumed, thus, there exists no tendency for ants or other insects to be drawn to food products lying about the pet feeding and watering apparatus.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A food serving assembly, comprising:
    (a) a lower dish forming a bottom wall and a tapered side wall, said side wall having a peripheral rim defining a first outer peripheral flange, said tapered side wall extending downwardly below said bottom wall and forming a support to position said bottom wall in spaced relation with any flat surface on which said apparatus rests;
    (b) a support tube being integral with and projecting upwardly from said bottom wall and being disposed in spaced relation with said tapered side wall and in off-center relation with the center of said bottom wall, said support tube having the upper end thereof located substantially at the level of said first outer peripheral flange and defining a plurality of vertically spaced locking aperture adjustment means;
    (c) an upper dish having a bottom wall and a tapered side wall and forming a second peripheral rim defining a second outer peripheral flange, said upper dish having a support pedestal being integral with and depending from said bottom wall, said support pedestal being receivable in supported relation within said support tube and being of a length for positioning said bottom wall of said upper dish above said side wall of said lower dish, said support tube defining locking aperture means for registry with said locking aperture means of said support tube; and
    a locking element selectively positionable within said locking aperture adjustment means of said support tube and within said locking aperture means of said support pedestal to enable selective vertical positioning of said lower dish relative to said upper dish in releasable assembly.

2. The food serving assembly of claim 1, wherein:
    said second outer peripheral flange of said upper dish is positioned above said peripheral rim of said lower dish and with a portion of said second peripheral flange projecting radially outwardly beyond said first peripheral rim.

3. The food serving assembly of claim 1, wherein:
    said lower dish and said upper dish are each of generally circular configuration.

4. The food serving assembly of claim 1, wherein:
    (a) said first and second outer peripheral flanges each define cover locking flanges; and
    (b) dish cover elements being provided respectively for said lower dish and said upper dish, each being provided with an outer interlocking rim for establishing interlocking relation respectively with said first and second outer peripheral flanges.

5. The food serving assembly of claim 4, wherein:
    (a) each of said first and second outer peripheral flanges defines a downwardly projecting peripheral flange portion being disposed in radially spaced relation with the respective side wall; and
    (b) each of said interlocking rims of said lower dish and upper dish cover elements define a downwardly projecting outer peripheral flange section, a horizontally oriented radially inwardly projecting flange section and an upwardly projecting flange section, said interlocking rims being yieldable about said cover locking flanges to establish substantially sealed releasable interlocking assembly with said cover locking flanges to releasably secure said lower dish and upper dish cover elements respectively to said lower dish and upper dish.

6. The food serving assembly of claim 5, wherein:
    said upper end of said support tube provides structural support for said dish cover element to resist forces that might tend to bend said dish cover inwardly.

7. An insect resistant combination food and water containing apparatus for pets, comprising:
    (a) a lower dish forming a tapered bottom wall and a tapered side wall having a peripheral rim defining a first outer peripheral locking flange, said tapered side wall extending downwardly below said bottom wall and forming a support to position said bottom wall in spaced relation with any flat surface on which said apparatus rests;

(b) a cylindrical tubular support element being integral with and projecting upward from said bottom wall and providing an upper end located substantially in registry with said outer peripheral locking flange, said cylindrical tubular support element defining a plurality of vertically spaced locking apertures;

(c) an upper dish having a bottom wall and having a tapered side wall means forming a second peripheral rim and forming a second outer peripheral locking flange located above said peripheral rim of said dish and with a portion of said second peripheral rim being located radially outwardly of said peripheral rim of said lower dish, said upper dish having a support pedestal being integral with and depending from said bottom wall, said support pedestal being receivable in supported relation within said cylindrical tubular support element and being of a length for positioning said bottom wall above said side wall of said lower dish, said support pedestal defining locking aperture means for selective registry with said locking aperture means of said cylindrical tubular support element; and (d) a locking element being selectively positionable within said registering locking aperture means of said cylindrical tubular support element and said support pedestal for releasably locking said lower dish and upper dish in assembly and for positioning said upper dish in selectively elevated relation with said lower dish.

8. The insect resistant combination food and water containing apparatus of claim 7, wherein:

(a) said support tube is positioned in off-center relation with respect to said bottom wall of said lower dish; and (b) said second outer peripheral flange of said upper dish is positioned above said peripheral rim of said lower dish and with a portion of said second peripheral flange projecting radially outwardly beyond said first peripheral rim of said lower dish.

9. The insect resistant combination food and water containing apparatus of claim 7, wherein:

(a) said lower dish and said upper dish are each of generally circular configuration.

10. The insect resistant combination food and water containing apparatus of claim 7, wherein:

(a) said first and second outer peripheral flanges each define cover locking flanges; and (b) lower dish and upper dish cover elements being provided respectively for said lower dish and said upper dish, each being provided with an outer interlocking rim for establishing interlocking relation respectively with said first and second outer peripheral flanges.

11. The insect resistant combination food and water containing apparatus of claim 10, wherein:

(a) each of said first and second outer peripheral flanges define a downwardly projecting peripheral flange portion being disposed in radially spaced relation with the respective side wall; and (b) each of said interlocking rims of said lower dish and upper dish cover elements define a downwardly projecting outer peripheral flange section, a horizontally oriented radially inwardly projecting flange section and an upwardly projecting inner flange section, said interlocking rims being yieldable about said cover locking flanges to establish substantially sealed releasable interlocking assembly with said cover locking flanges to releasably secure said lower dish and upper dish cover elements respectively to said lower dish and upper dish.

12. The insect resistant combination food and water containing apparatus of claim 11, wherein:

(a) said upper end of said support tube provides structural support for said dish cover element to resist forces that might tend to bend said dish cover element inwardly.

* * * * *